US012067924B2

(12) United States Patent
Li et al.

(10) Patent No.: US 12,067,924 B2
(45) Date of Patent: Aug. 20, 2024

(54) DISPLAY PANEL AND CONTROLLING METHOD THEREOF

(71) Applicant: TCL CHINA STAR OPTOELECTRONICS TECHNOLOGY CO., LTD., Guangdong (CN)

(72) Inventors: Zhisheng Li, Guangdong (CN); Dan Cao, Guangdong (CN); Wenfang Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/609,278

(22) PCT Filed: Sep. 7, 2021

(86) PCT No.: PCT/CN2021/116945
§ 371 (c)(1),
(2) Date: Mar. 2, 2023

(87) PCT Pub. No.: WO2023/024160
PCT Pub. Date: Mar. 2, 2023

(65) Prior Publication Data

US 2024/0029618 A1 Jan. 25, 2024

(30) Foreign Application Priority Data

Aug. 26, 2021 (CN) ......................... 202110987833.1

(51) Int. Cl.
*G09G 3/20* (2006.01)
*G09G 3/36* (2006.01)

(52) U.S. Cl.
CPC ......... *G09G 3/2074* (2013.01); *G09G 3/2096* (2013.01); *G09G 3/3607* (2013.01);
(Continued)

(58) Field of Classification Search
CPC .. G09G 3/2074; G09G 3/2096; G09G 3/3607; G09G 3/3648; G09G 2320/0209;
(Continued)

(56) References Cited

U.S. PATENT DOCUMENTS

2013/0147547 A1* 6/2013 Nalawade ............... G06F 30/36
327/551
2015/0194107 A1 7/2015 Bae et al.
(Continued)

FOREIGN PATENT DOCUMENTS

CN 103390394 A 11/2013
CN 105895040 A 8/2016
(Continued)

OTHER PUBLICATIONS

Chinese Office Action issued in corresponding Chinese Patent Application No. 202110987833.1 dated Mar. 15, 2022, pp. 1-8.
(Continued)

*Primary Examiner* — Richard J Hong
(74) *Attorney, Agent, or Firm* — PV IP PC; Wei Te Chung; Zhigang Ma

(57) ABSTRACT

The present application provides a display panel and a controlling method thereof. The method includes: obtaining two grayscale values corresponding to two locations in a same frame, wherein two data voltages of the two locations are transmitted by the same data line; obtaining a grayscale threshold value, and determining a grayscale difference value according to the two grayscale values; when an absolute value of the grayscale difference value is greater than grayscale threshold value, obtaining a first voltage
(Continued)

range, and determining the two data voltages corresponding to the two locations according to the first voltage range and the two grayscale values.

20 Claims, 7 Drawing Sheets

(52) U.S. Cl.
CPC ... *G09G 3/3648* (2013.01); *G09G 2320/0209* (2013.01); *G09G 2330/021* (2013.01)

(58) Field of Classification Search
CPC ........... G09G 2330/021; G09G 3/3406; G09G 3/3696; G09G 3/20; G06T 11/60; G06F 30/36; H04N 3/127
See application file for complete search history.

(56) References Cited

U.S. PATENT DOCUMENTS

| | | | | |
|---|---|---|---|---|
| 2017/0278470 | A1* | 9/2017 | Su | H04N 3/127 |
| 2019/0043417 | A1* | 2/2019 | Choe | G09G 3/3607 |
| 2020/0074708 | A1* | 3/2020 | Park | G06T 11/60 |
| 2021/0097947 | A1* | 4/2021 | Liu | G09G 3/3696 |
| 2021/0150968 | A1* | 5/2021 | Chen | G09G 3/3406 |
| 2021/0264833 | A1* | 8/2021 | Heo | G09G 3/20 |

FOREIGN PATENT DOCUMENTS

| | | | |
|---|---|---|---|
| CN | 109147688 | A | 1/2019 |
| CN | 109637476 | A | 4/2019 |
| CN | 109858398 | A | 6/2019 |
| CN | 110400532 | A | 11/2019 |
| CN | 110544461 | A | 12/2019 |
| CN | 110648643 | A | 1/2020 |
| CN | 111445825 | A | 7/2020 |
| CN | 112735347 | A | 4/2021 |

OTHER PUBLICATIONS

International Search Report in International application No. PCT/CN2021/116945, mailed on May 31, 2022.
Written Opinion of the International Searching Authority in International application No. PCT/CN2021/116945, mailed on May 31, 2022.

* cited by examiner

DISPLAY PANEL AND CONTROLLING METHOD THEREOF

RELATED APPLICATIONS

This application is a Notional Phase of PCT Patent Application No. PCT/CN2021/116945 having international filing date of Sep. 7, 2021, which claims the benefit of priority of Chinese Patent Application No. 202110987833.1 filed on Aug. 26, 2021. The contents of the above applications are all incorporated by reference as if fully set forth herein in their entirety.

FIELD OF INVENTION

The present application relates to a field of display technologies, especially to display device manufacturing, specifically to a display panel and a controlling method thereof.

BACKGROUND OF INVENTION

Liquid crystal display (LCD) has advantages such as long lifespans, convenience for colorization, and resistance to burn-in.

Capacitors exist between data lines and a common electrode plate in an LCD due to a coupling effect. Because a voltage difference of two ends of the capacitor cannot suddenly change in a short time, great variation of voltage signals transmitted in the data lines results in sudden change of the voltage of the common electrode plate to form crosstalk in corresponding locations in displayed images and lower quality of the displayed images of the LCD.

Therefore, a crosstalk phenomenon of displayed images existing in the conventional LCD resulting from the capacitor between the data line and the common electrode plate needs to be solved.

SUMMARY OF INVENTION

Technical Issue

An objective of the present application is to provide a display panel and a controlling method thereof to solve a technical issue that a crosstalk phenomenon exists in displayed images of the display panel to result in a lowered quality of the displayed images.

Technical Solution

The present application provides a display panel controlling method, including:

obtaining a first grayscale value of a first location and a second grayscale value of a second location of a display panel in a same frame, wherein a first data voltage of the first location and a second data voltage of the second location is transmitted by a same data line;

obtaining a grayscale threshold value, and determining a grayscale difference value according to the first grayscale value and the second grayscale value;

when an absolute value of the grayscale difference value is greater than the grayscale threshold value, obtaining a first voltage range and determining a first voltage value corresponding to the first data voltage and a second voltage value corresponding to the second data voltage according to the first voltage range, the first grayscale value, and the second grayscale value; and when the absolute value of the grayscale difference value is not greater than the grayscale threshold value, obtaining a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range; and wherein before the step of obtaining the first voltage range, the method includes:

obtaining a sign voltage value; and determining whether to obtain the first voltage range according to the sign voltage value.

In an embodiment, the interval of the first voltage range is (0,x], and the interval of the second voltage range is (0,y], and wherein y is less than x.

In an embodiment, the grayscale threshold value is 80.

In an embodiment, the according to the first voltage range, the step of determining the first voltage value corresponding to the first data voltage and the second voltage value corresponding to the second data voltage according to the first voltage range, the first grayscale value, and the second grayscale value, includes:

obtaining a plurality of grayscale tie point values and a plurality of first voltage tie point values in the first voltage range, wherein the first voltage tie point values correspond to the grayscale tie point values;

when the grayscale tie point values include the first grayscale value and the second grayscale value, obtaining the first voltage tie point value corresponding to the first grayscale value from the first voltage tie point values as the first voltage value, and obtaining the first voltage tie point value corresponding to the second grayscale value as the second voltage value;

when the grayscale tie point values do not include the first grayscale value, determining a first voltage non-tie point value corresponding to the first grayscale value as the first voltage value according to the first voltage tie point values, the grayscale tie point values, and a conversion rule; and when the grayscale tie point values do not include the second grayscale value, determining the first voltage non-tie point value corresponding to the second grayscale value as the second voltage value according to the first voltage tie point values, the grayscale tie point values, and the conversion rule.

In an embodiment, the step of obtaining the first voltage tie point values in the first voltage range, includes:

obtaining a plurality of first intervals and the first sub-voltage tie point values in each of the first voltage tie point values, wherein the first sub-voltage tie point values correspond to the first intervals one by one; and the step of obtaining the first voltage tie point value corresponding to the second grayscale value as the second voltage value, includes:

obtaining the first sub-voltage tie point value corresponding to the grayscale difference value from the first sub-voltage tie point values as the second voltage value according to the grayscale difference value, the first intervals, and the first voltage value.

In an embodiment, after the step of determining the grayscale difference value according to the first grayscale value and the second grayscale value, the method further includes:

when the absolute value of the grayscale difference value is greater than the grayscale threshold value, obtaining a charge time length range and determining a charge time length of the second location from the charge time length range according to the grayscale difference value.

The present application provides a display panel controlling method, including:

obtaining a first grayscale value of a first location and a second grayscale value of a second location of a display panel in a same frame, wherein a first data voltage of the first location and a second data voltage of the second location is transmitted by a same data line;

obtaining a grayscale threshold value, and determining a grayscale difference value according to the first grayscale value and the second grayscale value; and when an absolute value of the grayscale difference value is greater than the grayscale threshold value, obtaining a first voltage range and determining a first voltage value corresponding to the first data voltage and a second voltage value corresponding to the second data voltage according to the first voltage range, the first grayscale value, and the second grayscale value.

In an embodiment, after the step of determining the grayscale difference value according to the first grayscale value and the second grayscale value, the method further includes:

when the absolute value of the grayscale difference value is not greater than the grayscale threshold value, obtaining a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range.

In an embodiment, the interval of the first voltage range is (0,x], and the interval of the second voltage range is (0,y], and wherein y is less than x.

In an embodiment, the grayscale threshold value is 80.

In an embodiment, before the step of obtaining the first voltage range, the method includes:

obtaining a sign voltage value; and determining whether to obtain the first voltage range according to the sign voltage value.

In an embodiment, the according to the first voltage range, the step of determining the first voltage value corresponding to the first data voltage and the second voltage value corresponding to the second data voltage according to the first voltage range, the first grayscale value, and the second grayscale value, includes:

obtaining a plurality of grayscale tie point values and a plurality of first voltage tie point values in the first voltage range, wherein the first voltage tie point values correspond to the grayscale tie point values;

when the grayscale tie point values include the first grayscale value and the second grayscale value, obtaining the first voltage tie point value corresponding to the first grayscale value from the first voltage tie point values as the first voltage value, and obtaining the first voltage tie point value corresponding to the second grayscale value as the second voltage value;

when the grayscale tie point values do not include the first grayscale value, determining a first voltage non-tie point value corresponding to the first grayscale value as the first voltage value according to the first voltage tie point values, the grayscale tie point values, and a conversion rule; and when the grayscale tie point values do not include the second grayscale value, determining the first voltage non-tie point value corresponding to the second grayscale value as the second voltage value according to the first voltage tie point values, the grayscale tie point values, and the conversion rule.

In an embodiment, the step of obtaining the first voltage tie point values in the first voltage range, includes:

obtaining a plurality of first intervals and the first sub-voltage tie point values in each of the first voltage tie point values, wherein the first sub-voltage tie point values correspond to the first intervals one by one; and the step of obtaining the first voltage tie point value corresponding to the second grayscale value as the second voltage value, includes:

obtaining the first sub-voltage tie point value corresponding to the grayscale difference value from the first sub-voltage tie point values as the second voltage value according to the grayscale difference value, the first intervals, and the first voltage value.

In an embodiment, after the step of determining the grayscale difference value according to the first grayscale value and the second grayscale value, the method further includes:

when the absolute value of the grayscale difference value is greater than the grayscale threshold value, obtaining a charge time length range and determining a charge time length of the second location from the charge time length range according to the grayscale difference value.

The present application provides a display panel, the display panel includes:

an obtaining module configured to obtain a first grayscale value of a first location and a second grayscale value of a second location of a display panel in a same frame, wherein a first data voltage of the first location and a second data voltage of the second location is transmitted by a same data line;

a process module configured to obtain a grayscale threshold value, and determining a grayscale difference value according to the first grayscale value and the second grayscale value; and a control module, when an absolute value of the grayscale difference value is greater than the grayscale threshold value, configured to obtain a first voltage range and determine a first voltage value corresponding to the first data voltage and a second voltage value corresponding to the second data voltage according to the first voltage range, the first grayscale value, and the second grayscale value.

In an embodiment, when the absolute value of the grayscale difference value is not greater than the grayscale threshold value, the control module is further configured to obtain a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range.

In an embodiment, the display panel further includes:

a first obtaining module configured to obtain a sign voltage value;

a first determination module configured to determine whether the first voltage range is obtained according to the sign voltage value.

In an embodiment, the control module includes:

a first sub-obtaining module configured to obtain a plurality of grayscale tie point values and a plurality of first voltage tie point values in the first voltage range, wherein the first voltage tie point values correspond to the grayscale tie point values;

a first sub-control module, when the grayscale tie point values include the first grayscale value and the second grayscale value, configured to obtain the first voltage tie point value corresponding to the first grayscale value from the first voltage tie point values as the first voltage value, and obtain the first voltage tie point value corresponding to the second grayscale value as the second voltage value;

a second sub-control module, when the grayscale tie point values do not include the first grayscale value, configured to determine a first voltage non-tie point value corresponding to the first grayscale value as the first voltage value according to the first voltage tie point values, the grayscale tie point values, and a conversion rule; and a third sub-control module, when the grayscale tie point values do not include the second grayscale value, configured to determine the first voltage non-tie point value corresponding to the second grayscale value as the second voltage value according to the first voltage tie point values, the grayscale tie point values, and a conversion rule.

In an embodiment, the display panel further includes:

a first control module, when the absolute value of the grayscale difference value is greater than the grayscale threshold value, configured to obtain a charge time length range and determining a charge time length of the second location from the charge time length range according to the grayscale difference value.

In an embodiment, the display panel includes:

a system on a chip, wherein the obtaining module is disposed on the system on a chip;

a central control board electrically connected to the system on a chip, wherein the process module and a detection module are disposed on the central control board, and the detection module is configured to determine a sign voltage value according to the absolute value of the grayscale difference value; and a power management integrated circuit electrically connected to the central control board, wherein the power management integrated circuit includes the control module.

Advantages

The present application provides the display panel and the controlling method thereof, the method includes: obtaining a first grayscale value of a first location and a second grayscale value of a second location of a display panel in a same frame, wherein a first data voltage of the first location and a second data voltage of the second location is transmitted by a same data line; obtaining a grayscale threshold value, and determining a grayscale difference value according to the first grayscale value and the second grayscale value; when an absolute value of the grayscale difference value is greater than the grayscale threshold value, obtaining a first voltage range and determining a first voltage value corresponding to the first data voltage and a second voltage value corresponding to the second data voltage according to the first voltage range, the first grayscale value, and the second grayscale value. The present application determines the absolute value of the grayscale difference value and the grayscale threshold value, and further provides a limit to a condition of the absolute value of the grayscale difference value greater than the grayscale threshold value, specifically the limit is obtaining the first voltage range for determining the first voltage value and the second voltage value such that two voltage values corresponding to two locations with greater grayscale difference values can determined according to the first voltage range obtained after the above determination to avoid determination according to a regular voltage range to further reduce a crosstalk phenomenon in displayed images and improve quality of the displayed images.

DESCRIPTION OF DRAWINGS

Specific embodiments of the present invention are described in details with accompanying drawings as follows to make technical solutions and advantages of the present invention clear.

DETAILED DESCRIPTION OF PREFERRED EMBODIMENTS

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

In descriptions of the present application, terminologies "first", "second" are only for the purposes of description and cannot be understood as indication or implication of comparative importance or a number of technical features. Therefore, a feature limited with "first", "second" can expressly or implicitly include one or more features. In the description of the present application, a meaning of "a plurality of" is two or more, unless there is a clear and specific limitation otherwise. "Electrical connection" means that conductive is between two, which is not limited to direct connection or indirect connection. In addition, it should be noted that the attached drawings only provide a structure closely related to the present application and omit some details that are not relevant to the application. The purpose is to simplify the attached drawings such that the application features are clear at a glance rather than indicating what shown in the attached drawings is actually the same as an actual device, which is not a limit to the actual device.

The present application provides a display panel controlling method, and the method includes but is not limited to the following embodiments and a combination thereof.

Figure 1:
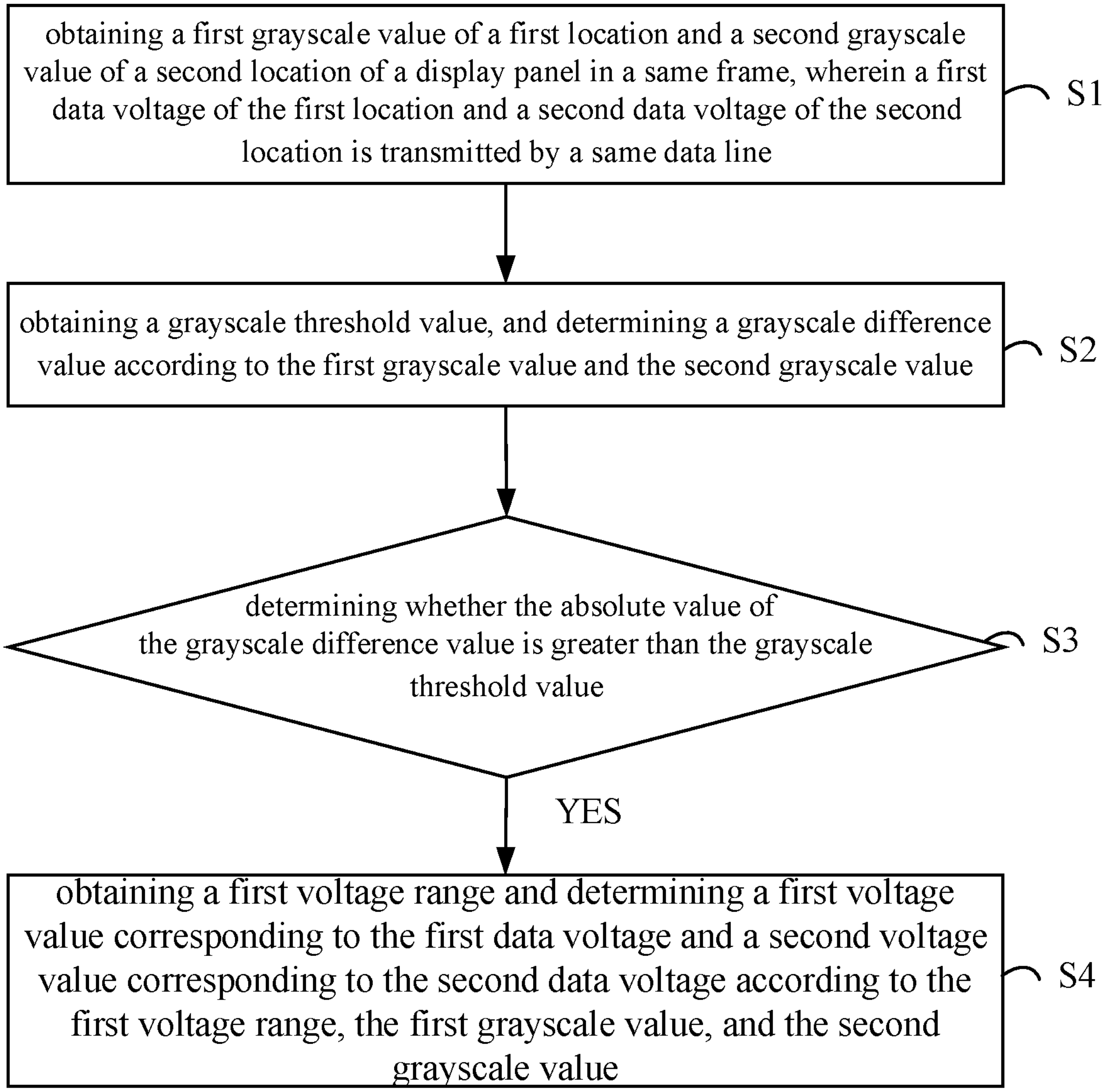
FIG. 1 is a flowchart of a display panel controlling method provided by an embodiment of the present application.

In an embodiment, with reference to FIG. 1, the display panel controlling method includes but is not limited to the following steps.

Step S1 includes obtaining a first grayscale value of a first location and a second grayscale value of a second location of a display panel in a same frame, wherein a first data voltage of the first location and a second data voltage of the second location is transmitted by a same data line.

The display panel can be a liquid crystal display panel. It can be understood that liquid crystal display panel includes a plurality of sub-pixels, at least one liquid crystal molecule corresponding to a location where each of the sub-pixels is located can rotate for different degrees under different voltage differences to transmit different amounts of light to further present different colors in combination with a color filter. Furthermore, pixel units constituted by a plurality of sub-pixels can commonly present a point image including a certain chroma and a certain brightness. In detail, when a voltage difference is applied to two ends of at least one liquid crystal molecule of one of the sub-pixel, light of the at least one liquid crystal molecule corresponding the sub-pixel before passing a light filter can theoretically present a grayscale image of one level in such grayscale images of 256 levels from 0 to 255. The voltage on an end of the liquid crystal molecule can be understood as a voltage value included by a pixel electrode of a corresponding one of the sub-pixels and can approximate to a voltage transmitted by the data line to the sub-pixel. A voltage on another end of the liquid crystal molecule can be understood as a voltage included by common electrode plate disposed opposite to the pixel units.

It should be noticed that the second data voltage of the first data voltage and the second location of the first location is outputted by the same data line, here row by row scan of scan lines is taken as an example for explanation. Namely, the first sub-pixel located in the first location and the second sub-pixel located in the second location are electrically connected to the same data line. Before one frame of an image is displayed, all theoretical grayscale values of the sub-pixels in the frame in the display panel can be reserved, the theoretical grayscale values can understandably refer to a level corresponding to a grayscale image included before light of the sub-pixel passes through a corresponding light filter under a condition without arbitrary interference. Therefore, in the present embodiment, before a frame of an image is displayed, both the theoretical grayscale value of the first sub-pixel and the theoretical grayscale value of the second sub-pixel can be stored in the display panel, here the first grayscale value being a theoretical grayscale value of the first sub-pixels and the second grayscale value being a theoretical grayscale value of the second sub-pixel are taken as an example for explanation.

Step S2 includes obtaining a grayscale threshold value, and determining a grayscale difference value according to the first grayscale value and the second grayscale value.

The grayscale difference value is a difference value between the first grayscale value and the second grayscale value, and the grayscale threshold value can be configured to evaluate an absolute value of the grayscale difference value. For example, the absolute value of the grayscale difference value greater than grayscale threshold value can indicate a greater grayscale difference value, namely, the first location and the second location are two locations with a theoretically greater grayscale value difference. On the contrary, the absolute value of the grayscale difference value not greater than grayscale threshold value can indicate a smaller grayscale difference value, namely, the first location and the second location are two locations with a theoretically smaller grayscale value difference. In detail, it can be understood according to the above descriptions that the first sub-pixel located in the first location and the second sub-pixel located in the second location are electrically connected to the same data line, and voltages of ends of the liquid crystal molecules located in the first location and the second location respectively are the same, both are equal to a voltage included by the common electrode plate. Furthermore, a voltage of another end of the liquid crystal molecule located in the first location is a voltage transmitted by the data line to the pixel electrode of the first sub-pixel, and a voltage of another end of the liquid crystal molecule located in the second location is a voltage transmitted by the data line to the pixel electrode of the second sub-pixels.

Figure 2:
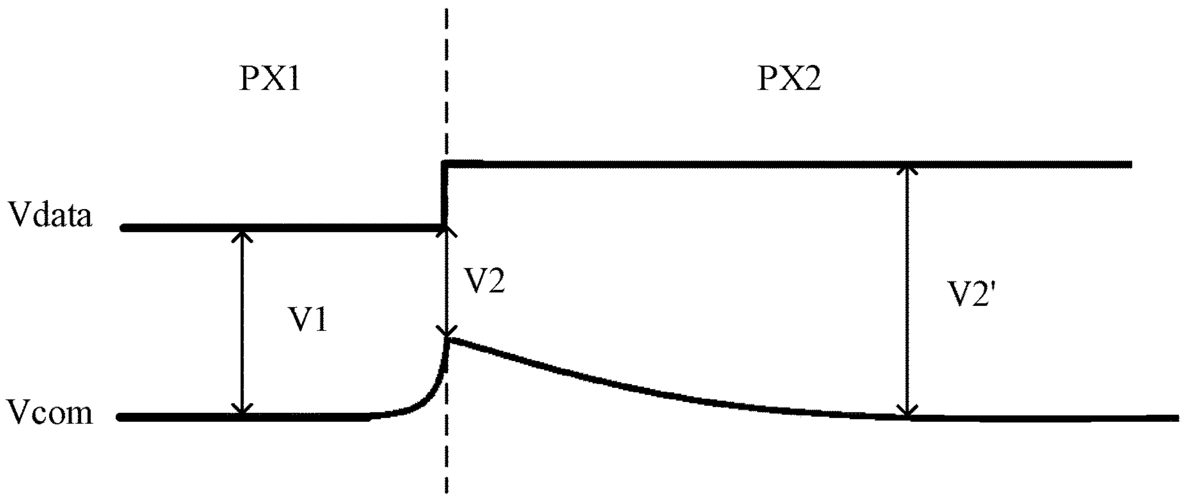
FIG. 2 is a schematic waveform view of voltage signals corresponding to a crosstalk phenomenon in the display panel.

It should be noticed that a capacitor is formed by coupling between a pixel electrode corresponding to each of the sub-pixels and the common electrode plate, a voltage difference between two ends of the capacitor cannot suddenly change. Here it can be considered that the first sub-pixel and the second sub-pixel are adjacent two sub-pixel or are two sub-pixels with a shorter distance. When the absolute value of the grayscale difference value is greater, accordingly, in the same frame, a voltage transmitted by the same data line to the pixel electrode of the first sub-pixel and a voltage transmitted by the same data line to the pixel electrode of the second sub-pixel have a greater difference. With reference to FIG. 2, here the first sub-pixel PX1 and the second sub-pixel PX1 being adjacent two sub-pixels are taken as an example for explanation. A voltage transmitted to the pixel electrode of the sub-pixel is Vdata, a voltage included by the common electrode plate is Vcom, a voltage difference between two ends of the liquid crystal molecule corresponding to the first sub-pixel PX1 is V1. It can be understood that according to the above analysis, here a greater voltage transmitted into the pixel electrode of the second sub-pixel PX2 is taken as an example for explanation. Furthermore, when a difference between the first grayscale value and the second grayscale value is greater, accordingly, a difference between a voltage transmitted to the pixel electrode of the second sub-pixel PX2 and a voltage transmitted to the pixel electrode of the first sub-pixel PX1 is greater, a characteristic of the capacitor results in that surge of a voltage Vdata of a voltage Vcom included by the common electrode plate on the data line during variation, and is gradually restored to an original voltage value later to cause a voltage of two ends of the liquid crystal molecule corresponding to the second sub-pixel PX2 gradually vary to theoretically V2' due to V2 caused by the surge, which is a crosstalk phenomenon of displayed images.

Step S3 includes determining whether the absolute value of the grayscale difference value is greater than the grayscale threshold value.

In detail, it can be understood according to the above descriptions that the grayscale threshold value can be configured to estimate the absolute value of grayscale difference value, and when the grayscale difference value is greater, namely, the first location and the second location are two locations with a greater theoretical grayscale value difference. It can be understood that according to the above analysis, here a crosstalk phenomenon of images exists and needs to be solved. It can be understood that the present embodiment improves corresponding images according to such determination step.

When an absolute value of the grayscale difference value is greater than the grayscale threshold value, the method includes but is not limited to the following step:

Step S4 includes obtaining a first voltage range and determining a first voltage value corresponding to the first data voltage and a second voltage value corresponding to the second data voltage according to the first voltage range, the first grayscale value, and the second grayscale value.

It can be understood that the step S4 is based on a prerequisite of "the absolute value of the grayscale difference value is greater than grayscale threshold value", namely, the first voltage range is a range set according to the prerequisite of "the absolute value of the grayscale difference value is greater than grayscale threshold value", the present embodiment obtains the first voltage range for determining the first voltage value the second voltage value such that the two voltage values corresponding to the two locations of the greater grayscale difference value can be determined according to the first voltage range obtained after determination of the above step S3 to prevent determination according to the regular voltage range to reduce the crosstalk phenomenon in displayed images, which improve quality of the displayed images.

In an embodiment, the grayscale threshold value is 80. It can be understood in combination with the above descriptions that when the absolute value of the grayscale difference value in the present embodiment is greater than 80, namely the step S4 can be implemented. Selection of the grayscale threshold value relates to circuit structures of the display panel and a size of the device. In detail, a test can be performed during manufacturing the display panel, the test can be selected to conform to the step S1 according to preference of display images, and the two grayscale values corresponding to two sub-pixels in which a image crosstalk phenomenon exists and able to be solved by the step S4 serve as the first grayscale value and the second grayscale value respectively.

In an embodiment, after the step S2 and further after the step S3, when the absolute value of the grayscale difference value is not greater than the grayscale threshold value, the method includes but is not limited to the following step.

Sep S5 includes obtaining a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range.

The absolute value of the grayscale difference value not greater than the grayscale threshold value means that the first location and the second location are two locations with a smaller theoretical grayscale value difference. It can be understood that the step S5 is based on a prerequisite of "the absolute value of the grayscale difference value is not greater than grayscale threshold value", namely the second voltage range is a range set according to the prerequisite of "the absolute value of the grayscale difference value is greater than grayscale threshold value". The present embodiment obtains the second voltage range for determining the third voltage value and the fourth voltage value such that two voltage values corresponding to two locations with a smaller grayscale difference value can be determined according to the second voltage range obtained after determination of the above step S3.

It should be noticed that in the present embodiment, a length of an interval of the first voltage range is less than a length of an interval of the second voltage range, which facilitate achieving an absolute value of a difference value of two voltages corresponding to two grayscale values of the greater difference value in the first voltage range to be less than an absolute value of a difference value of two voltages corresponding to the two grayscale values in the second voltage range. It can be understood that the present embodiment selects the first voltage range with a smaller length of an interval to determine the first voltage value and the second voltage value and selects the second voltage range with a greater length of an interval to determine the third voltage value and the fourth voltage value. It can be understood that according to the above analysis, the present embodiment facilitates achieving a difference value between the first voltage value and the second voltage value to be less than a difference value between the third voltage value and the fourth voltage value, accordingly, the voltage jump variation transmitted by the data line is smaller. As such, when the voltage transmitted by the data line is experiencing jump variation, the voltage of the common electrode plate would not surge to have less influence on a voltage of two ends of the liquid crystal molecule of the second sub-pixel, which mitigates crosstalk phenomenon of images.

In an embodiment, the interval of the first voltage range is (0,x], and the interval of the second voltage range is (0,y], and wherein y is less than x. Here the first voltage range and the second voltage range can be obtained by adjustment according to image preference during the test of display panel manufacturing. It should be noticed that for the absolute value of the grayscale difference value greater than the grayscale threshold value compared to the absolute value of the grayscale difference value not greater than grayscale threshold value, a voltage included by the common electrode plate can also be adjusted or not adjusted as long as it is guaranteed that during conversion of the voltage transmitted by the data line into the pixel electrode of the first sub-pixel to be inputted into the pixel electrode of the second sub-pixel, an amount of increase or decrease of the voltage included by the common electrode plate is sufficiently small.

Furthermore, on the basis of the step S5, for the absolute value of the grayscale difference value greater than grayscale threshold value relative to the absolute value of the grayscale difference value not greater than grayscale threshold value, when the data line inputs a voltage into the pixel electrode of the second sub-pixel, the voltage on the common electrode plate can also be adjusted synchronously. In detail, here a greater voltage transmitted into the pixel electrode of the second sub-pixel is taken as an example for explanation. It can be understood that according to the above analysis, the voltage included by the common electrode plate can be adjusted lower to suppressing surging of the voltage included by the common electrode plate.

Figure 3:
FIG. 3 is a schematic polyline view of grayscale values, voltage values of a first voltage range, and voltage values in a second voltage range provided by the embodiment of the present application.

After a test of the displayed images, y can be 13.202 volts, x can be 15.202 volts. In detail, with reference to Table 1 and FIG. 3, voltage values in the first voltage range and corresponding grayscale values form a polyline L1, voltage values in the second voltage range and corresponding grayscale values form a polyline L2. An abscissa refers to a value of the grayscale value, ordinate refers to a value of the corresponding voltage value. Abscissas of the polyline L1 and the polyline L2 include grayscale values of 0−, 0+, 1, 31, 127, 223, 254, and 255. A value range of the ordinate of the polyline L1 is from 0.208 to 13.202, and a value range of the ordinate of the polyline L2 is from 0.208 to 15.202. Here is no limit to locations of 0−, 0+, 0−, 0+ only means that such two grayscale values are infinitely close to 0. It can be understood from FIG. 3 that an ordinate value of a midpoint of 0−, 0+ serves as a boundary to depict an ordinate axis. It should be noticed that at this time the voltage value included by the common electrode plate can be the ordinate value corresponding to the midpoint of 0−, 0+. The voltage included by the common electrode plate can be calculated as 6.767 voltage according to Table 1. Both the polyline L1 and polyline L2 cross the ordinate axis, namely, in the polyline L1 and the polyline L2, each grayscale value can correspond to two voltage values, and the polyline L1 is basically located under the polyline L2. Of course, the voltage included by the common electrode plate can also be 5.325 voltage, at this time, both 0−, 0+ indicate rotation of the liquid crystal molecule along the same direction, and a rotational angle of the liquid crystal molecule corresponding to 0+ is slightly greater than a rotational angle of the liquid crystal molecule corresponding to 0−.

TABLE 1

| voltage value (second voltage range)/voltage | voltage value (first voltage range)/voltage | grayscale value |
|---|---|---|
| 15.202 | 13.202 | 255 |
| 13.841 | 12.841 | 254 |
| 12.872 | 10.872 | 223 |
| 10.804 | 9.804 | 127 |
| 8.522 | 9.222 | 31 |
| 8.027 | 7.627 | 1 |
| 7.963 | 7.363 | 0+ |
| 6.571 | 6.171 | 0− |
| 5.919 | 5.519 | 1 |
| 3.369 | 3.869 | 31 |
| 2.562 | 3.162 | 127 |
| 1.969 | 1.969 | 223 |
| 0.361 | 0.361 | 254 |
| 0.208 | 0.208 | 255 |

In detail, Table 1 is taken as an example for explanation, regarding the grayscale value of 127, two voltage values of 9.804 volts and 3.162 volts are within the first voltage range, and two voltage values of 10.804 volts and 2.562 volts are within the second voltage range. Furthermore, as the above descriptions and Table 1, for two grayscale values with a greater difference, the following can be matched substantially: an absolute value of a difference value of two voltage values within the first voltage range is less than an absolute value of a difference value of two voltage values within the second voltage range. It can be understood that the first grayscale value and the second grayscale value shall fulfill the following: an absolute value of a difference value of two voltage values corresponding to the first grayscale value and the second grayscale value in the first voltage range is less than an absolute value of a difference value of two voltage values corresponding to the first grayscale value and the second grayscale value in the second voltage range. Namely, a setting of the grayscale threshold value mentioned above should be determined in combination with specific values of voltages in the first voltage range, voltages in the second voltage range, and the grayscale value. For example, grayscale threshold value of 80 is not determined according to Table 1.

For example, the grayscale value 31 and the grayscale value 254 being two grayscale values with a greater difference are suitable for a condition of clockwise rotation of liquid crystals in Table 1. An absolute value 3.619 of a difference value of two voltage values in the first voltage range is less than an absolute value 5.391 of a difference value of two voltage values in the second voltage range. The grayscale value 1 and the grayscale value 254 being two grayscale values with a greater difference are suitable for a condition of counterclockwise rotation of liquid crystals in Table 1. An absolute value 5.518 of a difference value of two voltage values in the first voltage range is less than an absolute value 5.558 of a difference value of two voltage values in the second voltage range.

It should be noticed that when an absolute value of a difference value of two grayscale values is smaller, no matter whether a difference of two corresponding voltage values is greater or smaller, during variation of a voltage of the corresponding data line, although a voltage included by the common electrode plate varies accordingly such that a grayscale presented by the last sub-pixel has an issue at a moment, namely, at a moment, a grayscale value the same as that of a former sub-pixel is presented then is changed to a correct grayscale value, because a difference between the two grayscale values is smaller, an influence to the grayscale of a later sub-pixel is minor, and a crosstalk phenomenon is not apparent.

In the present embodiment, when the absolute value of a difference of the two grayscale values is greater, a grayscale value presented by a later one of the sub-pixels presents is the same as that presented by a former one of the sub-pixels and then changes to a correct grayscale value, because a difference of the two grayscale values is greater, the image have a crosstalk issue. In detail, the present embodiment can apply the first voltage value corresponding to the first grayscale value determined according to the first voltage range to the pixel electrode of the first sub-pixel and apply the second voltage value corresponding to the second grayscale value to the pixel electrode of the second sub-pixel. In detail, as shown in Table 1, for example, under a condition of clockwise rotation of the liquid crystal molecule, the first grayscale value is 31, and the second grayscale value is 254, an absolute value of a difference value of the first voltage value and the second voltage value in the first voltage range is 3.619, which is less than a difference value 5.391 of two voltage values in the second voltage value. As such, during the voltage on the data line switching from the first data voltage to the second data voltage, an amount of increase or decrease of a voltage of the common electrode plate is reduced, which can ease a crosstalk phenomenon of images.

Figure 4:
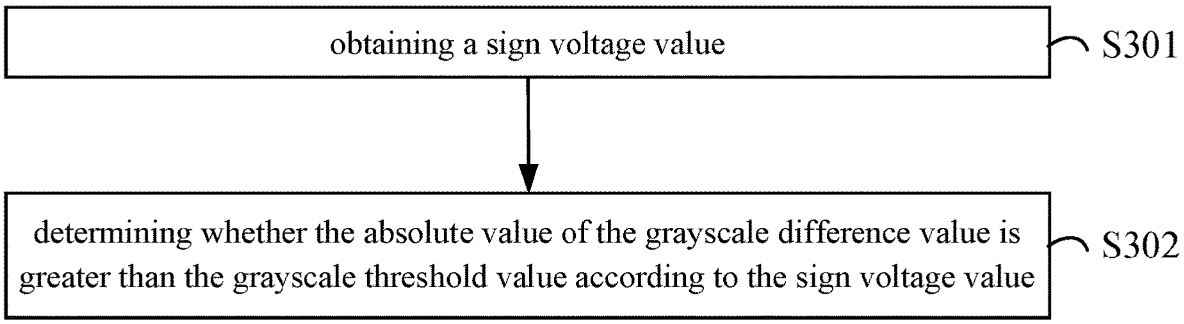
FIG. 4 is a flowchart of another display panel controlling method provided by the embodiment of the present application.

In an embodiment, with reference to FIG. 4, before the step of obtaining the first voltage range, furthermore, it can be understood that the step S3 can include but is not limited to the following step.

Step S301 includes obtaining a sign voltage value.

The sign voltage value can be determined according to a value relationship between the absolute value absolute value of grayscale difference value and the grayscale threshold value. In detail, when the absolute value of the grayscale difference value is greater than grayscale threshold value, the sign voltage value can be within the first sign voltage range; if not, the sign voltage value can be out of the first sign voltage range. Furthermore, sign voltage value can be within the second sign voltage range. The first sign voltage range is different from the second sign voltage range. Furthermore, to more easily distinguish the first sign voltage range from the second sign voltage range, it can be set that a length of an interval between the first sign voltage range and the second sign voltage range is not less than a predetermined length of an interval. Alternatively, under a condition that the sign voltage value is sufficiently stable, when the absolute value of the grayscale difference value is greater than the grayscale threshold value, the sign voltage value can be equal to the first sign voltage value; otherwise, the sign voltage value can be unequal to the first sign voltage value, Furthermore, sign voltage value can be equal to the second sign voltage value.

Step S302 includes determining whether the absolute value of the grayscale difference value is greater than the grayscale threshold value according to the sign voltage value.

It can be understood according to the above descriptions that the sign voltage value can be determined according to a value relationship between the absolute value of the grayscale difference value and the grayscale threshold value. Namely, the sign voltage value can indicate the value relationship between the absolute value of the grayscale difference value and the grayscale threshold value. It can be understood with reference to the step S4 and step S302 that when a determination result of the sign voltage value is "the absolute value of the grayscale difference value is greater than grayscale threshold value", the step S4 can be implemented, namely, the first voltage range is obtained, and the first voltage value corresponding to the first data voltage and the second voltage value corresponding to the second data voltage are determined according to the first voltage range, the first grayscale value, and the second grayscale value.

Figure 5:
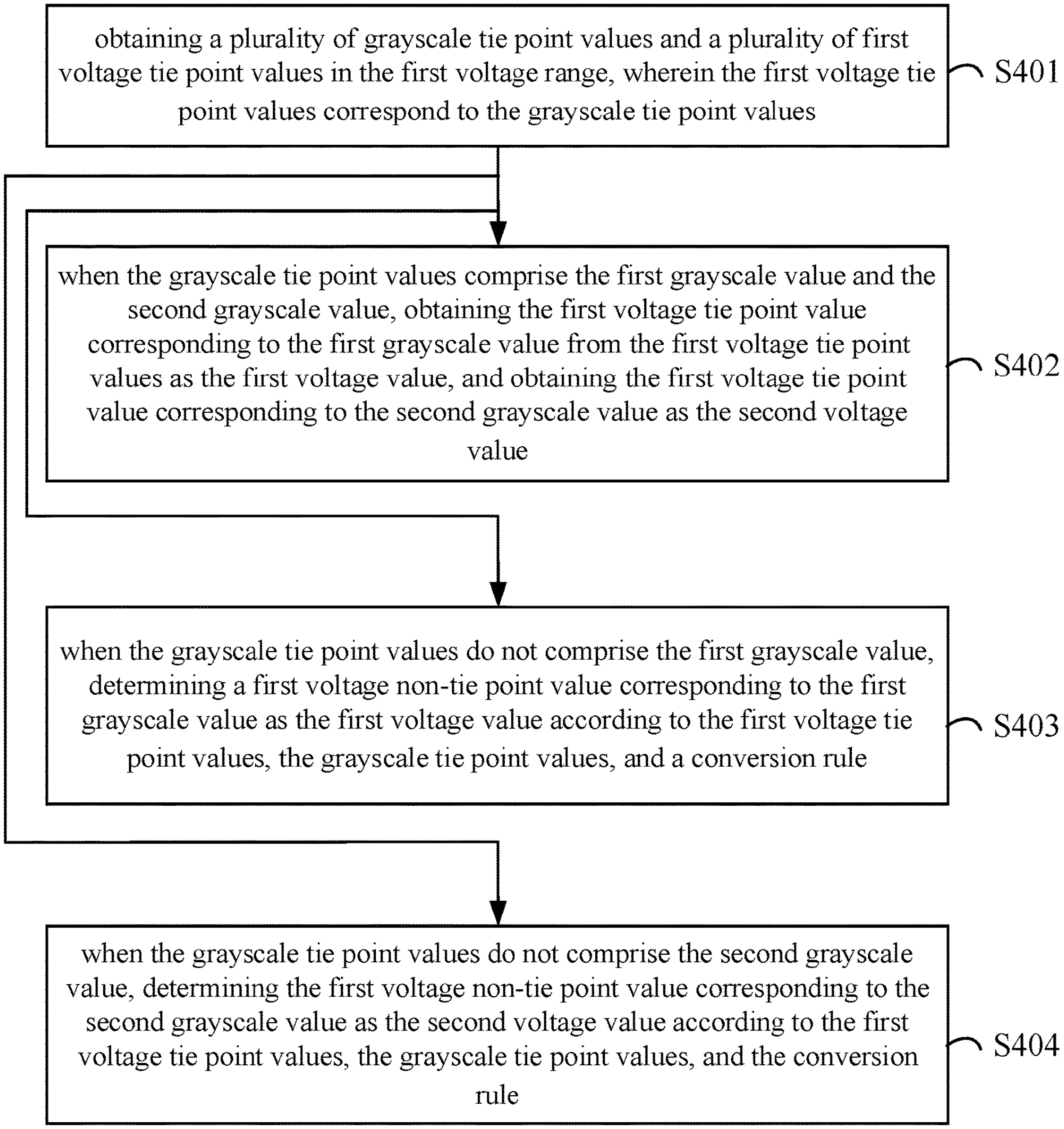
FIG. 5 is a flowchart of still another display panel controlling method provided by the embodiment of the present application.

In an embodiment, with reference to FIG. 5, the step S4 includes but is not limited to the following step.

Step S401 includes obtaining a plurality of grayscale tie point values and a plurality of first voltage tie point values in the first voltage range, wherein the first voltage tie point values correspond to the grayscale tie point values.

In detail, when liquid crystal molecule rotates along the same direction display of grayscales 0 to 255, furthermore, during rotation of the liquid crystal molecule along the same direction, when a voltage value loaded to a pixel electrode in a corresponding first sub-pixel or second sub-pixel is equal to one of first voltage tie point values, light passing through the liquid crystal molecule also presents a corresponding grayscale value called grayscale tie point value. It should be noticed that with reference to Table 1, grayscale tie point values can include 0, 1, 31, 127, 223, 254, and 255. It can be understood that according to the above analysis, clockwise rotation and counterclockwise rotation of the liquid crystal molecule are considered here. Therefore, in the first voltage range each of the grayscale tie point values can correspond to a voltage value corresponding to rotation of the liquid crystal clockwise and correspond to a voltage value corresponding to counterclockwise rotation of the liquid crystal.

Step S402 includes when the grayscale tie point values include the first grayscale value and the second grayscale value, obtaining the first voltage tie point value corresponding to the first grayscale value from the first voltage tie point values as the first voltage value, and obtaining the first voltage tie point value corresponding to the second grayscale value as the second voltage value.

It can be understood that the first voltage tie point values correspond to the grayscale tie point values. It can be understood in combination with the above descriptions and analysis, in the first voltage range, during rotation of the liquid crystal molecule along a direction, each of the grayscale tie point values has a corresponding first voltage tie point value. Considering clockwise rotation and counterclockwise rotation of the liquid crystal molecule, each of the grayscale tie point values has two corresponding first voltage tie point values. Therefore, when the grayscale tie point values include the first grayscale value and the second grayscale value, both the first voltage value and the second voltage value can include two voltage values. Furthermore, considering a responsive speed of the liquid crystal, a corresponding first voltage value and a corresponding second voltage value can be selected based on the liquid crystal molecule rotating along the same direction.

Step S403 includes when the grayscale tie point values do not include the first grayscale value, determining a first voltage non-tie point value corresponding to the first grayscale value as the first voltage value according to the first voltage tie point values, the grayscale tie point values, and a conversion rule.

In detail, a value range of the first grayscale value can be integers from 0 to 255, and a number of the grayscale tie point values in the first voltage range is far less than 256. Furthermore, the grayscale tie point values in the first voltage range and the first voltage tie point values can be combined, a linear interpolation method is used to obtain first voltage non-tie point values corresponding to other grayscale non-tie point values. wherein grayscale non-tie point values can be included between adjacent two of the grayscale tie point values, and accordingly, first voltage non-tie point values can also be included between adjacent two of the first voltage tie point values. Both the first voltage tie point values and the first voltage non-tie point value belong to the first voltage range.

In combination with the above descriptions, a conversion rule in the step S403 can include but is not limited to the above linear interpolation method. It can be understood that when the grayscale tie point values do not include the first grayscale value, a method such as a linear interpolation method can be used to obtain a grayscale non-tie point value equal to a first grayscale value to make a first voltage non-tie point value the first voltage value.

Step S404 includes when the grayscale tie point values do not include the second grayscale value, determining the first voltage non-tie point value corresponding to the second grayscale value as the second voltage value according to the first voltage tie point values, the grayscale tie point values, and the conversion rule.

In detail, both the first grayscale value and the second grayscale value are within the first voltage range, and the way for determining the second voltage value can be the same as the way for determining the first voltage, which can refer to related descriptions of the step S403.

In an embodiment, the step of obtaining the first voltage tie point values in the first voltage range, can include but is not limited to the following step: obtaining a plurality of first intervals and the first sub-voltage tie point values in each of the first voltage tie point values, wherein the first sub-voltage tie point values correspond to the first intervals one by one. The step of obtaining the first voltage tie point value corresponding to the second grayscale value as the second voltage value can include but is not limited to the following step: obtaining the first sub-voltage tie point value corresponding to the grayscale difference value from the first sub-voltage tie point values as the second voltage value according to the grayscale difference value, the first intervals, and the first voltage value.

It should be noticed that for voltages transmitted on the same data line, a value of a former voltage also affects a value of a later voltage and a voltage value included by the common electrode plate. It can be understood that the present embodiment sets the first voltage tie point values as first sub-voltage tie point values corresponding to first intervals, obtaining the second voltage value relates to the first voltage value.

In detail, ends of the first intervals can coincide with one another to cover a continuous real number range. It can be understood that each of the grayscale difference values can be located in one of the first intervals. For example, the greater the grayscale difference value is, the greater the first interval where the grayscale difference value is located is, otherwise, the smaller the first interval where the grayscale difference value is located is. Furthermore, each of the first intervals has a corresponding first sub-voltage tie point value, and the corresponding first sub-voltage tie point value can be determined according to the first interval where the grayscale difference value is located. For example, a corresponding first grayscale value when the second grayscale value is greater than first grayscale value is greater than a corresponding first grayscale value when the second grayscale value is not greater than first grayscale value, which can expedite a rotational speed of a liquid crystal molecule corresponding to the second sub-pixel to improve responsive speed and enhance quality of image display.

In an embodiment, after the step of determining the grayscale difference value according to the first grayscale value and the second grayscale value, the method can further include but is not limited to the following step: when the absolute value of the grayscale difference value is greater than the grayscale threshold value, obtaining a charge time length range and determining a charge time length of the second location from the charge time length range according to the grayscale difference value.

It can be understood that according to the above analysis, with reference to FIG. 2, a characteristic of the capacitor results in that surge of a voltage Vdata of a voltage Vcom included by the common electrode plate on the data line during variation, and is gradually restored to an original voltage value later to cause a voltage of two ends of the liquid crystal molecule corresponding to the second sub-pixel PX2 gradually vary to theoretically V2' due to V2 caused by the surge, which is a crosstalk phenomenon of displayed images. It should be noticed that in FIG. 2, a voltage Vdata on the data line corresponding to the second sub-pixel PX2 relates to a charge time length of the second sub-pixels, it can be considered that the longer the charge time length is, the greater the voltage Vdata of the data line corresponding to the second sub-pixel PX2 is, otherwise the smaller the voltage Vdata of the data line corresponding to the second sub-pixel PX2 is.

It can be understood that the present embodiment determines a relationship between the absolute value of the grayscale difference value and the grayscale threshold value to determine a charge time length range and further determines a charge time length of the first location according to the grayscale difference value. In detail, for example, when the absolute value of the grayscale difference value is greater than the grayscale threshold value, it indicates that the difference between the first grayscale value and the second grayscale value is excessively large, and at this time a specific charge time length range less than a regular charge time length is required to ensure that the crosstalk phenomenon is reduced while charging. Furthermore, a charge time length suitable for the second sub-pixel is further selected according to a specific difference value between the first grayscale value and the second grayscale value.

Figure 6:
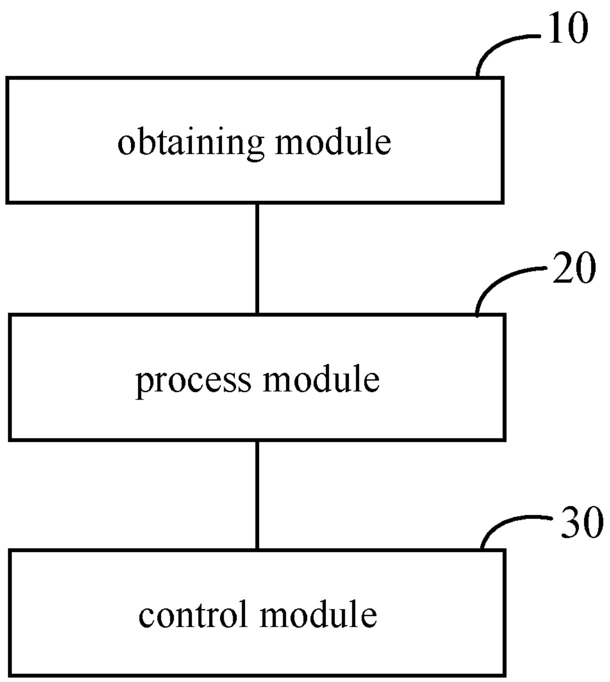
FIG. 6 is a structural framework view of the display panel provided by the embodiment of the present application.

The present application provides a display panel, with reference to FIG. 6, the display panel includes but is not limited to modules as follows.

An obtaining module 10 is configured to obtain a first grayscale value of a first location and a second grayscale value of a second location of a display panel in a same frame, wherein a first data voltage of the first location and a second data voltage of the second location is transmitted by a same data line.

In detail, specific functions of the obtaining module 10 can refer to related descriptions of the above step S1.

The process module 20 is configured to obtain a grayscale threshold value and determining a grayscale difference value according to the first grayscale value and the second grayscale value.

In detail, specific functions of the process module 20 can refer related descriptions of the above step S2.

The control module 30, when an absolute value of the grayscale difference value is greater than the grayscale threshold value, is configured to obtain a first voltage range and determine a first voltage value corresponding to the first data voltage and a second voltage value corresponding to the second data voltage according to the first voltage range, the first grayscale value, and the second grayscale value.

In detail, specific functions of the control module 30 can refer to related descriptions of the above step S3 to step S4.

In an embodiment, with reference to FIG. 7, the display panel includes but is not limited to devices as follows.

The system on a chip 40 has the obtaining module 10 disposed in the system on a chip 40.

In detail, before a frame of an image is played, the system on a chip 40 can store a theoretical grayscale value corresponding to each of the sub-pixels in a frame of an image in advance, and light emitted from the sub-pixels passing through a light filter presents a theoretical image, i.e. an ideal image. It can be understood that the first grayscale value of the first location and the second grayscale value of the second location are stored in other module of the system on a chip 40 in advance to be obtained by the obtaining module 10, or they can be directly stored in the obtaining module 10.

The central control board 50 is electrically connected to the system on a chip 40. The process module 20 and a detection module 70 are disposed in the central control board 50. The detection module 70 is configured to determine the sign voltage value according to the absolute value of the grayscale difference value.

In detail, specific functions of the detection module 70 can refer to related descriptions of the above step S301, namely, the central control board 50 can achieve the step S2 and the step S301 as described above. It can be understood that the process module 20 of the central control board 50 can be electrically connected to the obtaining module 10 to obtain the grayscale threshold value, the first grayscale value, and the second grayscale value to further determine the grayscale difference value. The detection module 70 can be electrically connected to the process module 20 to obtain the grayscale difference value and the grayscale threshold value to further determine sign voltage value.

The power management integrated circuit 60 is electrically connected to the central control board 50, and the power management integrated circuit 60 includes the control module 30.

In detail, other modules in the power management integrated circuit 60 or the control module 30 can store the first voltage range, and furthermore, also can store the second voltage range. The power management integrated circuit 60, after determining a value relationship between the absolute value of the grayscale difference value and the grayscale threshold value, can obtain at least one of the first voltage range and the second voltage range according to a determination result to further determine at least one of the first voltage value and the second voltage value.

Figure 7:
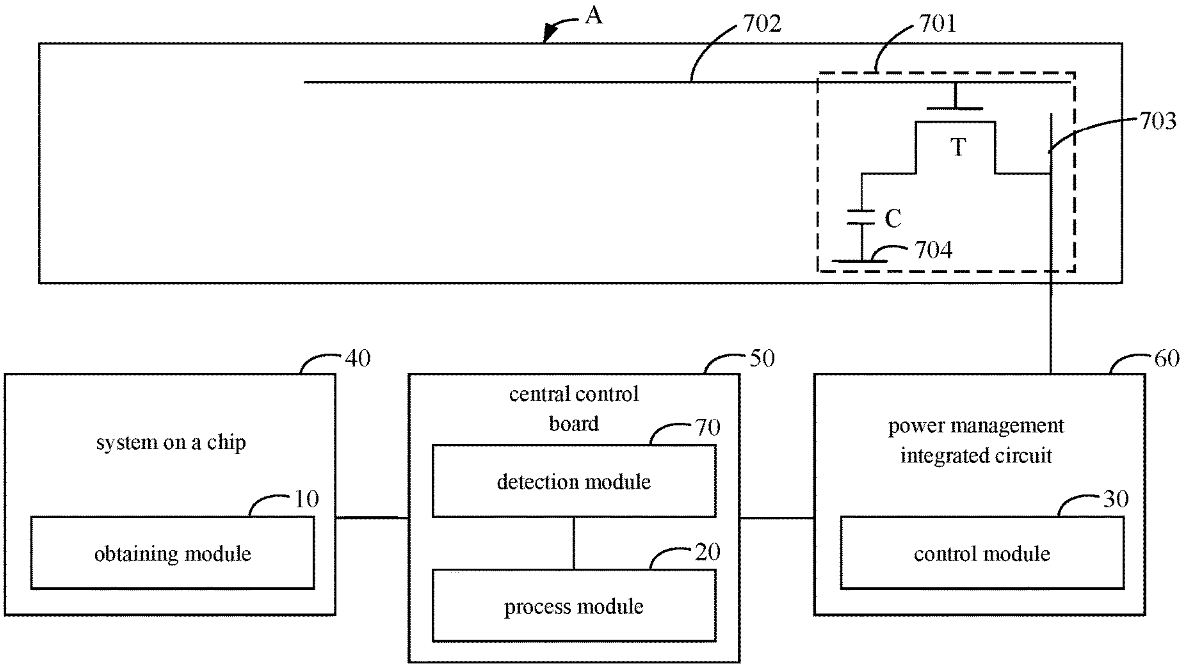
FIG. 7 is a structural framework view of another display panel provided by the embodiment of the present application.

Furthermore, with reference to FIG. 7, the power management integrated circuit 60 can be electrically connected to a plurality of pixel circuits 701 corresponding to a plurality of sub-pixels in a display region A. In detail, each pixel circuit 701 includes a driver transistor T, a gate electrode of the driver transistor T is electrically connected to a corresponding gate line 702, and a source electrode of the driver transistor T is electrically connected to the data line 703, another end of the data line 703 is electrically connected to the power management integrated circuit 60 to transmit voltages such as the first data voltage and the second data voltage within the first voltage range to the source electrode of the driver transistor T, or transmit voltages with in the second voltage range to the source electrode of the driver transistor T. A drain electrode of the driver transistor T is disposed as a pixel electrode, and a capacitor C is formed between the pixel electrode and the common electrode plate 704.

The present application provides a display panel and a controlling method thereof, the method includes: obtaining a first grayscale value of a first location and a second grayscale value of a second location of a display panel in a same frame, wherein a first data voltage of the first location and a second data voltage of the second location is transmitted by a same data line; obtaining a grayscale threshold value, and determining a grayscale difference value according to the first grayscale value and the second grayscale value; when an absolute value of the grayscale difference value is greater than the grayscale threshold value, obtaining a first voltage range and determining a first voltage value corresponding to the first data voltage and a second voltage value corresponding to the second data voltage according to the first voltage range, the first grayscale value, and the second grayscale value. The present application determines an absolute value of the grayscale difference value and the grayscale threshold value, and further provides a limit to a condition of the absolute value of the grayscale difference value greater than the grayscale threshold value, specifically the limit is obtaining the first voltage range for determining the first voltage value and the second voltage value such that two voltage values corresponding to two locations with greater grayscale difference values can determined according to the first voltage range obtained after the above determination to avoid determination according to a regular voltage range to further reduce a crosstalk phenomenon in displayed images and improve quality of the displayed images.

The display panel and the controlling method thereof provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments are or equivalently replace some of the technical features. These modifications or replacements do not depart from the essence of the technical solutions of the embodiments of the present application.

What is claimed is:

1. A display panel controlling method, comprising:

obtaining a first grayscale value of a first location and a second grayscale value of a second location of a display panel in a same frame, wherein a first data voltage of the first location and a second data voltage of the second location is transmitted by a same data line;

obtaining a grayscale threshold value, and determining a grayscale difference value according to the first grayscale value and the second grayscale value;

when an absolute value of the grayscale difference value is greater than the grayscale threshold value, obtaining a first voltage range and determining a first voltage value corresponding to the first data voltage and a second voltage value corresponding to the second data voltage according to the first voltage range, the first grayscale value, and the second grayscale value; and when the absolute value of the grayscale difference value is not greater than the grayscale threshold value, obtaining a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range; and wherein before the step of obtaining the first voltage range, the method comprises:

obtaining a sign voltage value; and determining whether to obtain the first voltage range according to the sign voltage value.

2. The display panel controlling method according to claim 1, wherein the interval of the first voltage range is (0,x], and the interval of the second voltage range is (0,y], and wherein y is less than x.

3. The display panel controlling method according to claim 1, wherein the grayscale threshold value is 80.

4. The display panel controlling method according to claim 1, wherein the step of determining the first voltage value corresponding to the first data voltage and the second voltage value corresponding to the second data voltage according to the first voltage range, the first grayscale value, and the second grayscale value, comprises:

obtaining a plurality of grayscale tie point values and a plurality of first voltage tie point values in the first voltage range, wherein the first voltage tie point values correspond to the grayscale tie point values;

when the grayscale tie point values comprise the first grayscale value and the second grayscale value, obtaining the first voltage tie point value corresponding to the first grayscale value from the first voltage tie point values as the first voltage value, and obtaining the first voltage tie point value corresponding to the second grayscale value as the second voltage value;

when the grayscale tie point values do not comprise the first grayscale value, determining a first voltage non-tie point value corresponding to the first grayscale value as the first voltage value according to the first voltage tie point values, the grayscale tie point values, and a conversion rule; and when the grayscale tie point values do not comprise the second grayscale value, determining the first voltage non-tie point value corresponding to the second grayscale value as the second voltage value according to the first voltage tie point values, the grayscale tie point values, and the conversion rule.

5. The display panel controlling method according to claim 4, wherein the step of obtaining the first voltage tie point values in the first voltage range, comprises:

obtaining a plurality of first intervals and the first sub-voltage tie point values in each of the first voltage tie point values, wherein the first sub-voltage tie point values correspond to the first intervals one by one; and the step of obtaining the first voltage tie point value corresponding to the second grayscale value as the second voltage value, comprises:

obtaining the first sub-voltage tie point value corresponding to the grayscale difference value from the first sub-voltage tie point values as the second voltage value according to the grayscale difference value, the first intervals, and the first voltage value.

6. The display panel controlling method according to claim 1, wherein after the step of determining the grayscale difference value according to the first grayscale value and the second grayscale value, the method further comprises:

when the absolute value of the grayscale difference value is greater than the grayscale threshold value, obtaining a charge time length range and determining a charge time length of the second location from the charge time length range according to the grayscale difference value.

7. A display panel controlling method, comprising:

obtaining a first grayscale value of a first location and a second grayscale value of a second location of a display panel in a same frame, wherein a first data voltage of the first location and a second data voltage of the second location is transmitted by a same data line;

obtaining a grayscale threshold value, and determining a grayscale difference value according to the first grayscale value and the second grayscale value; and when an absolute value of the grayscale difference value is greater than the grayscale threshold value, obtaining a first voltage range and determining a first voltage value corresponding to the first data voltage and a second voltage value corresponding to the second data voltage according to the first voltage range, the first grayscale value, and the second grayscale value.

8. The display panel controlling method according to claim 7, wherein after the step of determining the grayscale difference value according to the first grayscale value and the second grayscale value, the method further comprises:

when the absolute value of the grayscale difference value is not greater than the grayscale threshold value, obtaining a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range.

9. The display panel controlling method according to claim 8, wherein the interval of the first voltage range is (0,x], and the interval of the second voltage range is (0,y], and wherein y is less than x.

10. The display panel controlling method according to claim 7, wherein the grayscale threshold value is 80.

11. The display panel controlling method according to claim 7, wherein before the step of obtaining the first voltage range, the method comprises:

obtaining a sign voltage value; and determining whether to obtain the first voltage range according to the sign voltage value.

12. The display panel controlling method according to claim 7, wherein the step of determining the first voltage value corresponding to the first data voltage and the second voltage value corresponding to the second data voltage according to the first voltage range, the first grayscale value, and the second grayscale value, comprises:

obtaining a plurality of grayscale tie point values and a plurality of first voltage tie point values in the first voltage range, wherein the first voltage tie point values correspond to the grayscale tie point values;

when the grayscale tie point values comprise the first grayscale value and the second grayscale value, obtaining the first voltage tie point value corresponding to the first grayscale value from the first voltage tie point values as the first voltage value, and obtaining the first voltage tie point value corresponding to the second grayscale value as the second voltage value;

when the grayscale tie point values do not comprise the first grayscale value, determining a first voltage non-tie point value corresponding to the first grayscale value as the first voltage value according to the first voltage tie point values, the grayscale tie point values, and a conversion rule; and when the grayscale tie point values do not comprise the second grayscale value, determining the first voltage non-tie point value corresponding to the second grayscale value as the second voltage value according to the first voltage tie point values, the grayscale tie point values, and the conversion rule.

13. The display panel controlling method according to claim 12, wherein the step of obtaining the first voltage tie point values in the first voltage range, comprises:

obtaining a plurality of first intervals and the first sub-voltage tie point values in each of the first voltage tie point values, wherein the first sub-voltage tie point values correspond to the first intervals one by one; and the step of obtaining the first voltage tie point value corresponding to the second grayscale value as the second voltage value, comprises:

obtaining the first sub-voltage tie point value corresponding to the grayscale difference value from the first sub-voltage tie point values as the second voltage value according to the grayscale difference value, the first intervals, and the first voltage value.

14. The display panel controlling method according to claim 7, wherein after the step of determining the grayscale difference value according to the first grayscale value and the second grayscale value, the method further comprises:

when the absolute value of the grayscale difference value is greater than the grayscale threshold value, obtaining a charge time length range and determining a charge time length of the second location from the charge time length range according to the grayscale difference value.

15. A display panel, wherein the display panel comprises:

an obtaining module configured to obtain a first grayscale value of a first location and a second grayscale value of a second location of a display panel in a same frame, wherein a first data voltage of the first location and a second data voltage of the second location is transmitted by a same data line;

a process module configured to obtain a grayscale threshold value, and determining a grayscale difference value according to the first grayscale value and the second grayscale value; and a control module, when an absolute value of the grayscale difference value is greater than the grayscale threshold value, configured to obtain a first voltage range and determine a first voltage value corresponding to the first data voltage and a second voltage value corresponding to the second data voltage according to the first voltage range, the first grayscale value, and the second grayscale value.

16. The display panel according to claim 15, wherein when the absolute value of the grayscale difference value is not greater than the grayscale threshold value, the control module is further configured to obtain a second voltage range and determining a third voltage value corresponding to the first data voltage and a fourth voltage value corresponding to the second data voltage according to the second voltage range, the first grayscale value, and the second grayscale value, wherein a length of an interval of the first voltage range is less than a length of an interval of the second voltage range.

17. The display panel according to claim 15, wherein the display panel further comprises:

a first obtaining module configured to obtain a sign voltage value;

a first determination module configured to determine whether the first voltage range is obtained according to the sign voltage value.

18. The display panel according to claim 15, wherein the control module comprises:

a first sub-obtaining module configured to obtain a plurality of grayscale tie point values and a plurality of first voltage tie point values in the first voltage range, wherein the first voltage tie point values correspond to the grayscale tie point values;

a first sub-control module, when the grayscale tie point values comprise the first grayscale value and the second grayscale value, configured to obtain the first voltage tie point value corresponding to the first grayscale value from the first voltage tie point values as the first voltage value, and obtain the first voltage tie point value corresponding to the second grayscale value as the second voltage value;

a second sub-control module, when the grayscale tie point values do not comprise the first grayscale value, configured to determine a first voltage non-tie point value corresponding to the first grayscale value as the first voltage value according to the first voltage tie point values, the grayscale tie point values, and a conversion rule; and a third sub-control module, when the grayscale tie point values do not comprise the second grayscale value, configured to determine the first voltage non-tie point value corresponding to the second grayscale value as the second voltage value according to the first voltage tie point values, the grayscale tie point values, and a conversion rule.

19. The display panel according to claim 15, wherein the display panel further comprises:

a first control module, when the absolute value of the grayscale difference value is greater than the grayscale threshold value, configured to obtain a charge time length range and determining a charge time length of the second location from the charge time length range according to the grayscale difference value.

20. The display panel according to claim 15, wherein the display panel comprises:

a system on a chip, wherein the obtaining module is disposed on the system on a chip;

a central control board electrically connected to the system on a chip, wherein the process module and a detection module are disposed on the central control board, and the detection module is configured to determine a sign voltage value according to the absolute value of the grayscale difference value; and a power management integrated circuit electrically connected to the central control board, wherein the power management integrated circuit comprises the control module.

* * * * *